United States Patent [19]

Bakhru

[11] 4,173,759
[45] Nov. 6, 1979

[54] ADAPTIVE ANTENNA ARRAY AND METHOD OF OPERATING SAME

[75] Inventor: Keshoolal Bakhru, San Diego, Calif.

[73] Assignee: Cubic Corporation, San Diego, Calif.

[21] Appl. No.: 957,733

[22] Filed: Nov. 6, 1978

[51] Int. Cl.² .............................................. H04B 7/00
[52] U.S. Cl. .............................. 343/100 LE; 325/371
[58] Field of Search .................. 343/100 LE, 100 BL, 343/371

[56] References Cited

U.S. PATENT DOCUMENTS 4,086,592  4/1978  Lewis et al. .................... 343/100 LE Primary Examiner—Theodore M. Blum
Attorney, Agent, or Firm—Brown & Martin

[57] ABSTRACT

In the disclosed invention, electronic signals containing both information signals and interference signals in one frequency band are received from an array of N antenna elements. These signals are multiplied by the respective complex weights $u_k + jv_k$ where k varies from 1 through N. Each of the product terms thus formed is then summed and demodulated. The demodulated sum signal is bandpass filtered to form a signal $S_S$ which is representative of the sum of the demodulated information signals. Simultaneously, the demodulated sum signal is bandreject filtered to obtain a signal $I_S + N_S$ which is representative of the interference signals. Utilizing signals $S_S$ and $I_S + N_S$, the complex weights are modified such that the time rate of change of $u_k$ and $v_k$ respectively is proportional to the time rate of change of $T_e$ with respect to $u_k$ and $v_k$ where $T_e$ is the ratio of power in signals $S_S$ and $I_S + N_S$.

13 Claims, 4 Drawing Figures

TABLE 1

EQ. 1 $\quad T_e = \dfrac{P_{se}}{P_I}$

EQ. 2 $\quad \dfrac{d \ln T_e}{dt} = \sum\limits_{k=1}^{N} \left[ \dfrac{\partial \ln T_e}{\partial u_k} \cdot \dfrac{du_k}{dt} + \dfrac{\partial \ln T_e}{\partial v_k} \cdot \dfrac{dv_k}{dt} \right]$ EQ. 3A $\quad \dfrac{du_k}{dt} = C \dfrac{\partial \ln T_e}{\partial u_k}$ $\qquad$ EQ. 3B $\quad \dfrac{dv_k}{dt} = C \dfrac{\partial \ln T_e}{\partial v_k}$ EQ. 4 $\quad \dfrac{d \ln T_e}{dt} = C \sum\limits_{k=1}^{N} \left[ \left( \dfrac{\partial \ln T_e}{\partial u_k} \right)^2 + \left( \dfrac{\partial \ln T_e}{\partial v_k} \right)^2 \right]$ EQ. 5A $\quad \dfrac{du_k}{dt} = C \left\{ \dfrac{\overline{S_s S_k}}{P_{se}} - \dfrac{\overline{(I_s + N_s)(I_k + N_k)}}{P_I} \right\}$ EQ. 5B $\quad \dfrac{dv_k}{dt} = C \left\{ \dfrac{\overline{S_s S_{kc}}}{P_{se}} - \dfrac{\overline{(I_s + N_s)(I_{kc} + N_{kc})}}{P_I} \right\}$ EQ. 6A $\quad u_k(i+1) - u_k(i) = C \left\{ \dfrac{\overline{S_s S_k}}{P_{se}} - \dfrac{\overline{(I_s + N_s)(I_k + N_k)}}{P_I} \right\}$ EQ. 6B $\quad v_k(i+1) - v_k(i) = C \left\{ \dfrac{\overline{S_s S_{kc}}}{P_{se}} - \dfrac{\overline{(I_s + N_s)(I_{kc} + N_{kc})}}{P_I} \right\}$ EQ. 7 $\quad S_{kA} = V_s \cos(\omega_0 t - \psi_k + \phi)$ EQ. 8 $\quad I_{kA} = \sum\limits_{i=1}^{M} V_i \cos(\omega_0 t - \xi_{ki})$ EQ. 9 $\quad N_k = V_n \cos(\omega_0 t - n_k)$ EQ. 10 $\quad R_k = V_s \cos(\omega_0 t - \psi + \phi) + \sum\limits_{i=1}^{M} V_i \cos(\omega_0 t - \xi_{ki}) + V_n \cos(\omega_0 t - n_k)$ EQ. 11 $\quad \cos(A - B) = \cos A \cos B + \sin A \sin B$ EQ. 12 $\quad R_k = V_s \cos(\omega_0 t + \phi) \cos \psi_k + V_s \sin(\omega_0 t + \phi) \sin \psi_k$
$\qquad + \sum\limits_{i=1}^{M} V_i \cos(\omega_0 t) \cos \xi_{ki} + \sum\limits_{i=1}^{M} V_i \sin(\omega_0 t) \sin \xi_{ki}$
$\qquad + V_n \cos(\omega_0 t) \cos n_k + V_n \sin(\omega_0 t) \sin n_k$ EQ. 13 $\quad R_{kc} = V_s \sin(\omega_0 t - \psi_k + \phi) + \sum\limits_{i=1}^{M} V_i \sin(\omega_0 t - \xi_{ki}) + V_n \sin(\omega_0 t - n_k)$ EQ. 14 $\sin(A-B) = \sin A \cos B - \cos A \sin B$ EQ. 15 $R_{kc} = V_s \sin(\omega_0 t + \phi)\cos\psi_k - V_s \cos(\omega_0 t + \phi)\sin\psi_k$
$$+ \sum_{i=1}^{M} V_i \sin(\omega_0 t)\cos\xi_{ki} - \sum_{i=1}^{M} V_i \cos(\omega_0 t)\sin\xi_{ki}$$
$$+ V_n \sin(\omega_0 t)\cos n_k - V_n \cos(\omega_0 t)\sin n_k$$

EQ. 16 $u_k R_k + v_k R_{kc} = V_s \left[u_k \cos\psi_k - v_k \sin\psi_k\right]\cos(\omega_0 t + \phi)$
$$+ V_s \left[v_k \cos\psi_k + u_k \sin\psi_k\right]\sin(\omega_0 t + \phi)$$
$$+ \sum_{i=1}^{M} V_i \left[u_k \cos\xi_{ki} - v_k \sin\xi_{ki}\right]\cos(\omega_0 t)$$
$$+ \sum_{i=1}^{M} V_i \left[v_k \cos\xi_{ki} + u_k \sin\xi_{ki}\right]\sin(\omega_0 t)$$
$$+ V_n \left[u_k \cos n_k - v_k \sin n_k\right]\cos(\omega_0 t)$$
$$+ V_n \left[v_k \cos n_k + u_k \sin n_k\right]\sin(\omega_0 t)$$

EQ. 17 $R_s = \sum_{k=1}^{N} u_k R_k + \sum_{k=1}^{N} v_k R_{kc}$

EQ. 18 $X_s = \sum_{k=1}^{N} (u_k \cos\psi_k - v_k \sin\psi_k)$

EQ. 19 $Y_s = \sum_{k=1}^{N} (v_k \cos\psi_k + u_k \sin\psi_k)$

EQ. 20 $X_i = \sum_{k=1}^{N} (u_k \cos\xi_{ki} - v_k \sin\xi_{ki})$

EQ. 21 $Y_i = \sum_{k=1}^{N} (v_k \cos\xi_{ki} + u_k \sin\xi_{ki})$

EQ. 22 $X_n = \sum_{k=1}^{N} (u_k \cos n_k - v_k \sin n_k)$

EQ. 23 $Y_n = \sum_{k=1}^{N} (v_k \cos n_k + u_k \sin n_k)$

EQ. 24  $R_s = V_s X_s \cos(\omega_0 t + \phi) + \sum_{i=1}^{M} V_i X_i \cos(\omega_0 t) + V_n X_n \cos \omega_0 t$ $\quad + V_s Y_s \sin(\omega_0 t + \phi) + \sum_{i=1}^{M} V_i Y_i \sin(\omega_0 t) + V_n X_n \sin \omega_0 t$ EQ. 25  $S_s = (V_s X_s + \sum_{i=1}^{M} v_i X_i + v_n X_n) \cos \omega_{IF} t + (V_s Y_s + \sum_{i=1}^{M} v_i Y_i + v_n Y_n) \sin \omega_{IF} t$ EQ. 26  $I_s + N_s = \left(\sum_{i=1}^{M} V_i X_i + V_n X_n\right) \cos \omega_{IF} t + \left(\sum_{i=1}^{M} V_i Y_i + V_n Y_n\right) \sin \omega_{IF} t$ EQ. 27  $T_e = \dfrac{\frac{1}{2}\left(V_s X_s + \sum_{i=1}^{M} v_i X_i\right)^2 + \frac{1}{2}\left(V_s Y_s + \sum_{i=1}^{M} v_i Y_i\right)^2 + \frac{1}{2}\overline{v_n^2} \sum_{k=1}^{N}\left(u_k^2 + v_k^2\right)}{\frac{1}{2}\left(\sum_{i=1}^{M} V_i X_i\right)^2 + \frac{1}{2}\left(\sum_{i=1}^{M} V_i Y_i\right)^2 + \frac{1}{2}\overline{v_n^2} \sum_{k=1}^{N}\left(u_k^2 + v_k^2\right)}$ EQ. 28  $\dfrac{\partial \ln T_e}{\partial u_k} = \dfrac{1}{E\{|S_s|^2\}} \left[\left(V_s X_s + \sum_{i=1}^{M} v_i X_i\right)\left(V_s \cos \psi_k + \sum_{i=1}^{M} v_i \cos \xi_{ki}\right)\right.$ $\quad \left. + \left(V_s Y_s + \sum_{i=1}^{M} v_i Y_i\right)\left(V_s \sin \psi_k + \sum_{i=1}^{M} v_i \sin \xi_{ki}\right) + \overline{v_n^2} u_k\right]$ $\quad - \dfrac{1}{E\{|I_s + N_s|^2\}} \left[\left(\sum_{i=1}^{M} v_i X_i\right)\left(\sum_{i=1}^{M} v_i \cos \xi_{ki}\right) + \left(\sum_{i=1}^{M} v_i Y_i\right)\left(\sum_{i=1}^{M} v_i \sin \xi_{ki}\right) + \overline{v_n^2} u_k\right]$ EQ. 29  $S_k = (V_s \cos \psi_k + \sum_{i=1}^{M} v_i \cos \xi_{ki} + v_n \cos n_k) \cos \omega_{IF} t$ $\quad + (V_s \sin \psi_k + \sum_{i=1}^{M} v_i \sin \xi_{ki} + v_n \sin n_k) \sin \omega_{IF} t$ EQ. 30  $\overline{S_s S_k} = \frac{1}{2}\left(V_s X_s + \sum_{i=1}^{M} v_i X_i\right)\left(V_s \cos \psi_k + \sum_{i=1}^{M} v_i \cos \xi_{ki}\right) + \frac{1}{2}\overline{v_n^2 X_n \cos n_k}$ $\quad + \frac{1}{2}\left(V_s Y_s + \sum_{i=1}^{M} v_i Y_i\right)\left(V_s \sin \psi_k + \sum_{i=1}^{M} v_i \sin \xi_{ki}\right) + \frac{1}{2}\overline{v_n^2 Y_n \sin n_k}$ EQ. 31  $\overline{X_n \cos n_k} = \overline{Y_n \sin n_k} = \dfrac{u_k}{2}$ EQ. 32  $\overline{S_s S_k} = \frac{1}{2}\left(V_s X_s + \sum_{i=1}^{M} v_i X_i\right)\left(V_s \cos\psi_k + \sum_{i=1}^{M} v_i \cos\xi_{ki}\right)$ $+ \frac{1}{2}\left(V_s Y_s + \sum_{i=1}^{M} v_i Y_i\right)\left(V_s \sin\psi_k + \sum_{i=1}^{M} v_i \sin\xi_{ki}\right) + \frac{1}{2}\overline{v_n^2} u_k$ EQ. 33  $I_k + N_k = \left(\sum_{i=1}^{M} v_i \cos\xi_{ki} + V_n \cos n_k\right)\cos\omega_{IF} t + \left(\sum_{i=1}^{M} v_i \sin\xi_{ki} + V_n \sin n_k\right)\sin\omega_{IF} t$ EQ. 34  $\overline{(I_s+N_s)(I_k+N_k)} = \frac{1}{2}\left(\sum_{i=1}^{M} v_i X_i\right)\left(\sum_{i=1}^{M} v_i \cos\xi_{ki}\right) + \frac{1}{2}\left(\sum_{i=1}^{M} v_i Y_i\right)\left(\sum_{i=1}^{M} v_i \sin\xi_{ki}\right) + \frac{1}{2}\overline{v_n^2} u_k$ EQ. 35  $\dfrac{\partial \ln T_e}{\partial u_k} = 2\left\{\dfrac{\overline{S_s S_k}}{E\{|S_s|^2\}} - \dfrac{\overline{(I_s+N_s)(I_k+N_k)}}{E\{|I_s+N_s|^2\}}\right\}$ EQ. 36  $E\{|S_s|^2\} = P_{se}$ and $E\{|I_s+N_s|^2\} = P_I$ EQ. 37  $\dfrac{\partial \ln T_e}{\partial u_k} = 2\left\{\dfrac{\overline{S_s S_k}}{P_{se}} - \dfrac{\overline{(I_s+N_s)(I_k+N_k)}}{P_I}\right\}$ EQ. 38  $S_{kc} = -\left(V_s \sin\psi_k + \sum_{i=1}^{M} v_i \sin\xi_{ki} + v_n \sin n_k\right)\cos\omega_{IF} t$ $+ \left(V_s \cos\psi_k + \sum_{i=1}^{M} v_i \cos\xi_{ki} + v_n \cos n_k\right)\sin\omega_{IF} t$ EQ. 39  $I_{kc} + N_{kc} = -\left(\sum_{i=1}^{M} v_i \sin\xi_{ki} + V_n \sin n_k\right)\cos\omega_{IF} t$ $+ \left(\sum_{i=1}^{M} v_i \cos\xi_{ki} + V_n \cos n_k\right)\cos\omega_{IF} t$ EQ. 40  $\dfrac{\partial \ln T_e}{\partial v_k} = 2\left\{\dfrac{\overline{S_s S_{kc}}}{P_{se}} - \dfrac{\overline{(I_s+N_s)(I_{kc}+N_{kc})}}{P_I}\right\}$

ADAPTIVE ANTENNA ARRAY AND METHOD OF OPERATING SAME

BACKGROUND OF THE INVENTION

This invention relates to antennas for receiving radiated electronic signals, and more particularly to adaptive antenna arrays. Basically, adaptive antenna arrays are utilized to receive desired information signals in a predetermined frequency band while at the same time rejecting undesired interference signals in the same frequency band. To accomplish this, the information signals and interference signals must be received from the different directions. In one typical operating environment, the antenna array is physically mounted in a guided missile; and the information signals are transmitted by the missile controller from one direction while the interference signals are intentionally transmitted by an alien source from another direction. Such interference signals are commonly known as jamming signals.

In the art, various adaptive antenna arrays have been disclosed which attempt to overcome the above described problem. These prior art arrays include LMS (least means squares) arrays, MSN (maximum signal to noise ratio) arrays, SMI (simple matrix inversion) arrays, and RS (random search) arrays. All of these arrays, and the algorithms upon which their performance is based, have been well described in the literature and thus they will not be further described here.

However, each of the above mentioned prior art antenna arrays have deficiencies which the disclosed invention overcomes. For example, the LMS antenna array which currently enjoys the greatest popularity, operates by placing nulls in its reception pattern at locations corresponding to the directions from which the interference signals are received. This is achieved by minimizing the mean squared error between the array sum output and a known reference signal. A problem with this antenna array however, is that with fewer interference signals than antenna elements or with widely separated antenna elements regardless of the number of interfering signals the reception pattern can suffer an unwanted null at the exact location at which the desired information signal is being received. This cannot occur with the disclosed invention.

Further, the LMS antenna array requires a replica of the information signal to be available at the receiver input. This also is not required by the disclosed invention.

The disclosed invention also has advantages in communication systems which use a narrow receive band for tracking the source of the transmitted information signal. With the disclosed invention, the turning on of a new interference signal while the information signal source is being tracked will not cause lock of track to be broken. By contrast, with an LMS adaptive array, when the new interference signal is turned on, altered weights could deflect the main beam off the proper track angle. And if system range were great, the loss in signal accompanying the beam deflection might not be tolerable.

Therefore, it is one object of the invention to provide improved apparatus for separating desired information signals from undesired interference signals.

Still another object of the invention is to provide an improved method of separating desired information signals from undesired interference signals by an adaptive antenna array.

SUMMARY OF THE INVENTION

These and other objects are accomplished in accordance with the invention by an adaptive antenna array that includes N antenna elements. Electrical signals $R_K = S_{KA} + I_{KA} + N_K$ where K varies from 1 through N are generated by these antenna elements. Signal $S_{KA}$ the desired modulated information signal. Signal $I_{KA}$ is at least one interference signal. And $N_{KA}$ is noise produced in the antenna element. All of these signals occupy the same frequency band.

In accordance with the invention, each of the signals $R_K$ is multiplied by respective complex weights $u_k + jv_k$ to form product terms. Subsequently, all of these product terms are summed to form a signal $R_S$, which in turn is demodulated. The demodulated $R_S$ signal is then simultaneously sent through a bandpass filter and band-reject filter to form signals $S_S$ and $I_S + N_S$ respectively. The bandpass filter passes only those frequencies contained in the demodulated information signal frequency band, whereas the band reject filter passes those frequencies lying outside of that frequency band.

Using the outputs from these two filters the power in signals $S_S$ and $I_S + N_S$ is determined. Subsequently the complex weights $u_k + jv_k$ are modified such that the time rate of change of $u_k$ is proportional to the rate of change of $T_e$ with respect to $u_k$ and such that the time rate of change of $u_k$ is proportional to the rate of change of $T_e$ with respect to $v_k$. Here, $T_e$ represents the ratio of the power in signals $S_S$ and $I_S + N_S$.

Due to the above time variation of multiplier weights $u_k$ and $v_k$, the time rate of change of $T_e$ is always positive. That is, $T_e$ continually increases until it reaches a maximum. In effect, this is accomplished by first generating nulls in the arrays reception pattern and locations corresponding to the direction of the interfering signals. Then the main lobes of the arrays reception pattern are steered in the direction of the desired information signals. In other words, the disclosed invention uses two degrees of freedom in shaping the arrays reception pattern.

BRIEF DESCRIPTION OF THE DRAWINGS

Various preferred embodiments of the invention will best be understood by referring to the drawings and detailed description wherein.

Figures 3, 4:
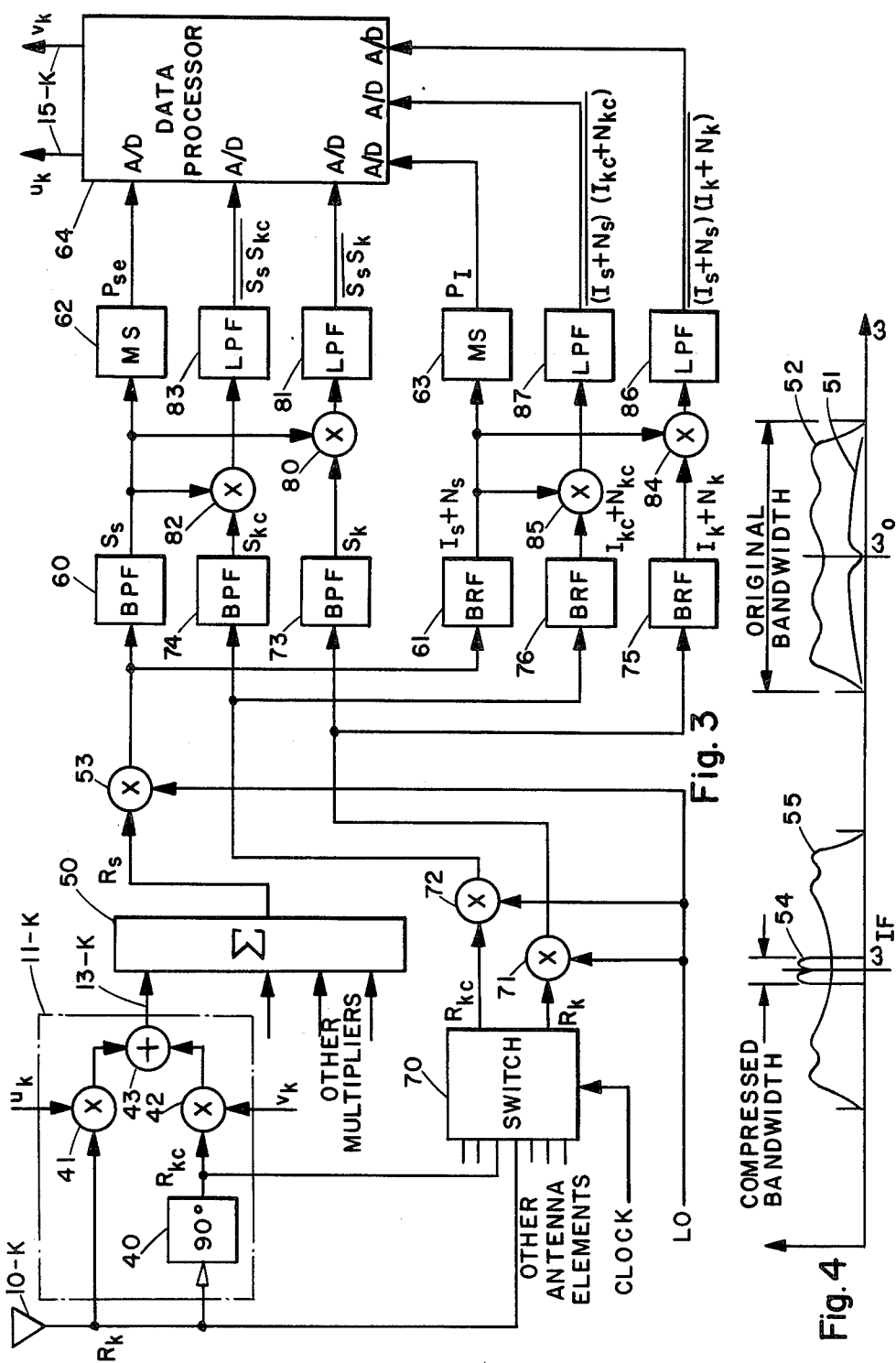
FIG. 3 is a circuit diagram of a preferred embodiment of the FIG. 1 antenna array.
FIG. 4 is a frequency diagram of signals at various points in the FIG. 3 circuit.

Table 1 is a set of equations explaining the method of operation of the FIG. 3 circuit.

DETAILED DESCRIPTION

Figure 1:
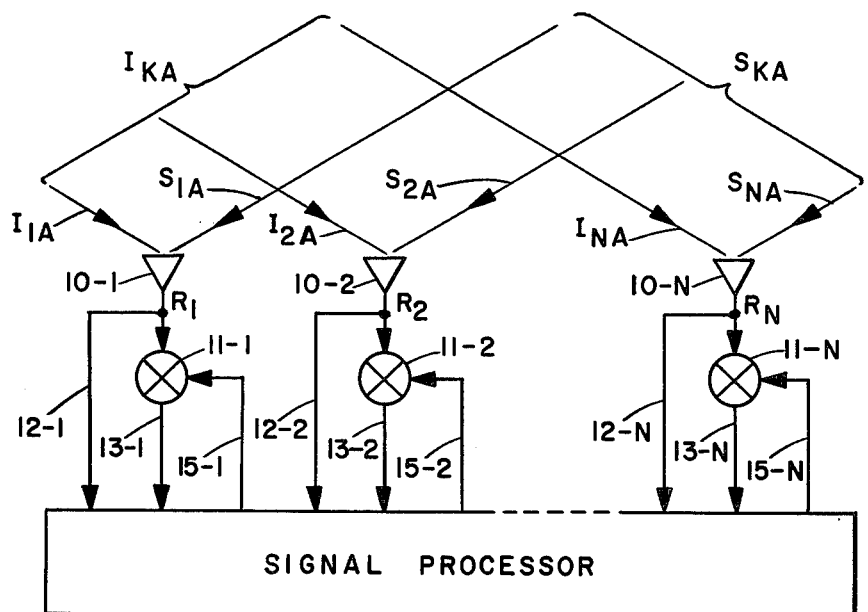
FIG. 1 is a block diagram of an adaptive antenna array constructed according to the invention.

Referring now to FIG. 1, a block diagram of an antenna array constructed according to the invention will be described. This array includes a plurality of antenna elements 10-1, 10-2, . . . 10-N. These antenna elements may be unipole, dipole, loop shaped, helicoidal shaped, or be any one of a variety of other well known types. Coupled to the outputs of each of the antenna elements are respective multipliers 11-1, 11-2, . . . 11-N. Also lead pairs 12-1 and 13-1, 12-2 and 13-2 . . 12-N and 13N couple respective outputs of the antenna elements and their multipliers to a signal processor 14. And processor 13 has outputs 15-1, 15-2 ... 15-N which feedback to the multipliers 11-1, 11-2 ... 11-N.

In operation, antennas 10-1, 10-2, ... 10-N simultaneously receive modulated information signals $S_{KA}$ and interference signals $I_{KA}$ in the same frequency band. The notation $S_{KA}$ and $I_{KA}$ in FIG. 1 indicates that antenna 10-1 receive signals $S_{1A}$ and $I_{1A}$, antenna 10-2 receives signals $S_{2A}$ and $I_{2A}$ etc. As can be seen from FIG. 1, signals $S_{1A}, S_{2A} ... S_{NA}$ differ from each other only in time delay due to the geometry of the antenna array. The same is true of signals $I_{1A}, I_{2A} ... I_{NA}$. Signals $S_{KA}$ and $I_{KA}$ are received from different directions, and it is the function of signal processor 14 to generate complex weights $u_k + jv_k$ on leads 15-1 through 15-N such that the output signals from multipliers 11-1 through 11-N can be used to specially filter the information signals $S_{KA}$ from the interference signals $I_{KA}$.

Figure 2:
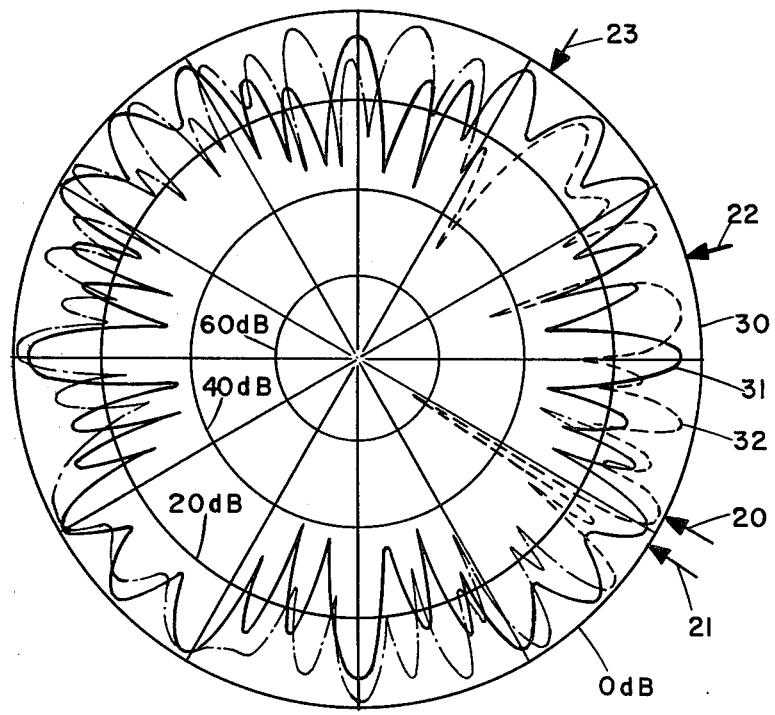
FIG. 2 is a set of curves illustrating the reception pattern of the FIG. 1 antenna array during consecutive time intervals.

An overall understanding of the disclosed invention may be obtained by reference to FIG. 2. This figure is a plot of a computer simulation of an example of the disclosed invention, wherein an array of six antenna elements simultaneously receive one information signal 20 and three interference signals 21, 22 and 23. The relative positions of signals 20 through 23 is illustrated in FIG. 2. Signals 20 and 21 have an angular displacement of only six degrees.

Included in FIG. 2 is a set of curves 30, 31 and 32. They respectively represent the gain of the antenna array at time instant $T_0$ time instant $T_0 + 30$ microseconds, and time instant $T_0 + 100$ microseconds. Time instant $T_0$ is the time at which signal processor 14 begins to send complex weights to multipliers 11-1 through 11-N.

These curves clearly show that the disclosed invention not only increases the signal to noise ratio of the antenna array by substantial amount, but that it also does this in an extremely short period of time. For example, after only 100 microseconds, interference signal 21 is more than 60 kB below information signal 20. Thus, the disclosed invention is well suited for environments where the antenna array is moving, such as on a missile.

The details of the disclosed method for modifying the complex weights on leads 15-1 through 15-N, as well as apparatus for carrying out the method, will now be described in conjunction with FIG. 3. As therein, illustrated, multiplication of the signals $R_K$ from the antenna elements by a complex weight $u_k + jv_k$ is achieved by means of a 90 degrees phase shifter 40, a pair of scaler multipliers 41 and 42, and a summer 43. Phase shifter 40 operates to phase shift signals $R_K$ from antenna elements 10-K by 90 degrees to thereby form signals $R_{KC}$. Multipliers 41 and 42 respectively operate to multiply weight $u_k$ times $R_K$, and $v_k$ times $R_{KC}$. And summer 43 operates to form signals on a lead 13-K equal to the sum of the output from multipliers 41 and 42. By this mechanism, signal $R_K$ is modified both in amplitude and phase in accordance with the complex weight $u_k + jv_k$.

All of the signals on leads 13-K are added through a summer 50 to form a signal $R_S$. This signal includes both the sum of all the information signals $S_{KA}$ and the sum of all the interference signals $I_{KA}$. Further, it includes a component $N_{KA}$ which is noise produced in each of the antenna elements. By antenna element herein, is meant the physical antenna plus any filtering or amplification circuitry associated therewith. Signal $R_S$ is illustrated in the frequency domain of FIG. 4. There, reference numeral 51 indicates magnitude of the information frequencies in signal $R_S$, whereas reference numeral 52 represents the magnitude of both the interference and noise contained in signal $R_S$.

Next, signal $R_S$ is demodulated by a multiplier 53. Accordingly, multiplier 53 has a pair of inputs for respectively receiving signal $R_S$ and a local oscillator signal LO. Due to this demodulation, the frequency bandwidth that is occupied by the information signals $S_{KA}$ in signals $R_S$ is greatly decreased. At the same time however, the frequency bandwidth occupied by the noise and interference signals in signal $R_S$ remain substantially unchanged. This is illustrated in FIG. 4 where reference numeral 54 represents the frequency band occupied by the information signals after demodulation, and reference numeral 55 represents the corresponding interference and noise signal bandwidth.

Any one of a variety of information modulation schemes may be utilized to achieve this bandwidth compression. In one preferred embodiment, the phase of the information signals $S_{KA}$ changes by plus or minus 180 degrees in accordance with a psuedo random sequence; whereas in another preferred embodiment the carrier frequency changes in predetermined discrete increments in a psuedo random sequence. In either case, an original bandwidth of 10 $MH_Z$ and a compressed bandwidth of 10 $KH_Z$ may readily be achieved.

The demodulated $R_S$ signal is then filtered by a pair of filters 60 and 61. Filter 60 is a bandpass filter, whereas filter 61 is a bandreject filter. The former operates to pass only signals within the compressed bandwidth 54; while the latter operates to only pass frequency components lying outside of the compressed bandwidth. Thus, signal $S_S$ from filter 60 is representative of the sum of the demodulated $S_{KA}$ signals.

In addition however, it contains those frequency components of the noise and interference signal that lie within the compressed bandwidth 54. Similarly, signal $I_S + N_S$ from filter 61 is representative of the sum of the interference signals $I_{KA}$ and the noise signal $N_{KA}$. However, signal $I_S + N_S$ differs from the actual sum of the interference signal $I_{KA}$ and noise signals $N_{KA}$ in that they exclude those frequency components which lie within the compressed bandwidths 54.

Next, the ratio of the power contained in the signals $S_S$ and $I_S + N_S$ is determined. This is accomplished by feeding signal $S_S$ into a circuit 62 which operates to form the mean square average of its input. The output of circuit 62 is herein rotated as $P_{se}$. Similarly, signal $I_S + N_S$ is fed through a circuit 63 which operates to form the mean square average of its input. The output of circuit 63 is herein rotated as $P_I$.

Signals $P_{se}$ and $P_I$ are then sent to a data processor 64. This processor operates to determine how the ratio of $P_{se}$ to $P_I$ varies with respect to modification of the complex weights $u_k$ and $u_k$. In particular, processor 64 operates to change $u_k$ and $v_k$ such that the time rate of change $u_k$ is proportional to the rate of change to $T_e$ with respect to $u_k$ and such that the time rate of change $u_k$ is proportional to the rate of change of $T_e$ with respct to $u_k$ where $T_e$ is the ratio of $P_{se}$ to $P_I$.

To aid in the calculation of these time rate of changes, the preferred embodiment of FIG. 3 includes that circuitry which has yet to be described. Basically, this remaining portion of the FIG. 3 circuitry forms various signals which are algebraically combined by processor 64 in a manner such that the time rate of change of $u_k$ and $v_k$ are as described above. This remaining circuitry includes an analog switching circuit 70. It has one pair of inputs for each of the antenna elements. One of these inputs receive signals $R_K$ directly from an antenna element; whereas the other input receives the phase delayed antenna signals $R_{KC}$. Selection of the signals $R_K$ and $R_{KC}$ from a particular antenna element is made by means of clocking signals herein indicated as CLOCK. Switch 70 has a pair of outputs, and at any one particular time instant, the source of the signals on these outputs is determined by the state of the clocking signals.

Both of the signals $R_K$ and $P_{KC}$ at the output of switch 70 are sent to respective multipliers 71 and 72. The previously described local oscillator signal LO also connects to a second input of these multipliers. Thus, in operation, multiplier 71 compresses the bandwidth of the information signal within signal $R_K$ and multiplier 72 compresses the bandwidth of the information signal in signals $R_{KC}$. The operation here is similar to that previously described in conjunction withh FIG. 4.

The demodulated outputs from multipliers 71 and 72 are then sent through bandpass filters 73 and 74. Filter 73 forms signal $S_K$; whereas filter 74 forms signal $S_{KC}$. Both signals $S_K$ and $S_{KC}$ are representative of the demodulated $S_{KA}$ signals. Similarly, the output of multipliers 71 and 72 couple to respective band reject filters 75 and 76. Filters 75 form a signal $I_K + N_K$, whereas filter 76 forms a signal $I_{KC} + N_{KC}$. Both of these signals lie outside of the compressed bandwidth and are representative of the interference and noise signals $I_{KA}$ and $N_{KA}$.

The remaining circuitry is included to perform various time average correlations on the above described signals. Specifically, a multiplier 80 and a low pass filter 81 is included to perform a time average correlation on signals $S_S$ and $S_K$. Similarly, a multiplier 82 and a low pass filter 83 is included to perform a time average correlation on signals $S_S$ and $S_{KC}$. In FIG. 3, the overbar symbol indicates a time average correlation of the signals included thereunder. In like manner, the FIG. 3 embodiment includes multipliers 84 and 85, and low pass filters 86 and 87. These are interconnected as illustrated to form a time average correlation on signals $I_S + N_S$ and $I_K + N_K$, and also on signals $I_S + N_S$ and $I_{KC} + N_{KC}$.

The manner in which data processor 64 forms the complex weight $u_k$ and $v_k$ from the terms that it receives from mean square circuits 62 and 63, and low pass filters 81, 83, 86, and 87 may best be understood by reference to the equations of Table 1. There, equation 1 gives an expression for the effective signal to noise ratio $T_e$ as being equal to the signal received from mean square circuit 62 divided by the signal received from mean square circuit 63. This ratio varies with time in response to the varying of the complex weights $u_k$ and $v_k$. This fact is stated more precisely by equation 2, which states that the time derivative of the natural log of $T_e$ is equal to the sum of the partial derivative of $T_e$ with respect to the complex weight $u_k$ times the time rate of change of $u_k$ plus the partial derivative of the natural log of $T_e$ with respect to the complex weight $v_k$ times the time rate of change of $v_k$.

The question of course, is how should the weights $u_k$ and $v_k$ be changed with time in order to maximize $T_e$. In the disclosed method, the answer to this question is given by equations 3A and 3B. There, the time rate of change of weight $u_k$ is made proportional to the partial derivative of a natural log $T_e$ with respect to $u_k$ and the time rate of change of $v_k$ is made proportional to the partial derivative of the natural log of $T_e$ with respect to $v_k$. With these conditions being held true, the time rate of change of $T_e$ is assured to always be positive. Thus, $T_e$ will always be increasing with time. This fact is expressed by equation 4, which shows that each of the terms that form the time rate of change of $T_e$ is a squared term and thus the time rate of change must be positive.

The problem then becomes one of evaluating the partial derivative in equations 3A and 3B so that the weights $u_k$ and $v_k$ can be easily determined. As will be shown shortly, equation 3A may be rewritten as equation 5A, and equation 3B may be rewritten as equation 5B. And as equations 5A and 5B show the partial derivative of $T_e$ with respect to $u_k$ may be formed by an algebraic combination of the quantities from mean square circuits 62 and 63, and low pass filter circuits 81 and 86. Similarly, the partial derivative of $T_e$ with respect to $v_k$ may be formed from the algebraic combination of the signals from mean square circuits 62 and 63, and low pass filter circuits 83 and 87.

In the preferred embodiment of FIG. 3, the complex weights $u_k$ and $v_k$ are not changed in a continuous manner. Instead, they are changed in discrete increments as equations 6A and 6B indicate. In equation 6A, the time derivative of $u_k$ is approximated by the difference between successive values of $u_k$. Similarly, in equation 6B, the time derivative of $u_k$ is approximated by the difference between successive values of $u_k$. The algebraic manipulations indicated in equations 6A and 6B are in the preferred embodiment of FIG. 3 performed by data processor 64.

It now remains to be shown that the partial derivative of the natural log of $T_e$ with respect to $u_k$ is equal to the right hand term of equation 5A, and that the partial derivative of the natural log of $T_e$ with respect to $u_k$ is equal to the right hand term of equation 5B. To show this, a mathematical expression for signal $R_S$ must be derived. This may be done with the help of equations 7, 8, and 9. Equation 7 is a mathematical expression for the modulated information signal received by the antenna elements. Equation 9 is a mathematical expression for M interference signals received by the antenna elements. And equation 9 is a mathematical expression for quisent noise produced in the antenna elements. This includes noise generated by any filtering or amplifying before multiplication by the complex weights occurs.

In equation 7 and 8, the terms $\psi_K$ and $\xi_{KI}$ represent phase constants. These are dependent on both the phase of the signal source and the antenna array geometry. Also in equation 7, the term $\phi$ represents a pseudo random noise modulation. That is, $\phi$ switches from plus $\pi$ to minus $\pi$ and vice versa in a predetermined pseudo random sequence. It should be emphasized however, that other forms of modulation such as frequency hopping for example, are equally suitable in the disclosed method. Finally, in equation 9, the term $n_k$ represents a random phase angle that is uniformly distributed between $+\pi$ and $-\pi$. Thus, equation 9 represents a zero mean Gaussian process.

Utilizing equations 7 through 9, a mathematical expression for the previously defined signals $R_K$ may be written. Equation 10 gives this expression. Next, the phase angles $\psi_K$ and $\xi_{KI}$ in equation 10 are separated out by utilizing the identity of equation 11. The result of this step is shown as equation 12.

A similar development may be performed to obtain a mathematical expression for the previously described signal $R_{KC}$. This signal equals signal $R_K$ delayed by 90°. Thus, by phase shifting each of the signals of equations 7, 8, and 9 by 90° and by summing the results, equation 13 for $R_{KC}$ is obtained. Then by using the identity of equation 14, the phase angles can be separated out with the result being equation 15.

Now utilizing the equations 12 and 15, an expression may be written for the K-th input signal to summer 50. This expression is given as equation 16. There are a total of N inputs to summer 50. And thus, summing the N terms of equation 16 where K varies from L to N yields an expression for the summer output signal $R_S$. This is given as equation 17.

It is now helpful to define some new variables $X_s$, $Y_s$, $X_i$, $Y_i$, $X_n$, and $Y_n$ which contain all the phase information in equations 16 and 17. Expressions for these variables are given by equations 18 through 23. Utilizing these newly defined variables, equation 17 may be rewritten in the more compact form of equation 24.

Utilizing the expression for signal $R_S$ in equation 24, it is now possible to write an expression for the output of bandpass filter 60 and an expression for the output of bandreject filter 61. The expression are given by equations 25 and 26 respectively. In equation 25, the modulating term $\phi$ has been eliminated. This is due to the operation of demodulator multiplier 53.

Also in equation 25, the carrier frequency $W_0$ has been shifted to an intermediate frequency $W_{IF}$. This is in accordance with the previously described frequency diagram of FIG. 4. Further in equation 25, the terms $V_I$ and $V_N$ have been changed to $v_I$ and $v_N$ respectively. These latter terms represent that portion of the interference signals and channel noise signals that lie within the compressed bandwidth of the demodulated information signals. This also was previously described in conjunction with FIG. 4.

In comparison, equation 26 is similar to equation 24, but in the former, the terms representing the information signals are eliminated. This is due to the operation of the bandreject filter 61. Also in equation 26, the original carrier frequency $W_0$ is replaced with the intermediate frequency $W_{IF}$. Finally, in equation 26, it will be apparent that the terms $V_I$ and $V_N$ represent an approximation of the actual magnitude of the interference and noise signals that pass through bandreject filters 61. This is a very close approximation however, since the compressed bandwidth is substantially less than the original bandwidth. And thus, the portion of the interference signals and noise signals that is rejected by filter 61 is negligible in comparison to that portion that is passed.

Utilizing equations 25 and 26, an expression may now be written for $T_e$. This is given in equation 27. There, the overbar indicates the time average of the terms contained underneath. Next, using equation 27, an expression for the partial derivative of $T_e$ with respect to $u_k$ and an expression for the partial derivative of $T_e$ with respect to $u_k$ may be derived. Equation 28 gives the exact expression for the former. In that equation, the term E followed by brackets represents the time average of the quantity contained in the bracket. A similar expression can be written for the partial derivative of $T_e$ with respect to $v_k$.

The next steps show that the terms contained in equation 28 may alternatively be expressed as algebraic combinations of the terms that are sent to processor 64 in the FIG. 3 circuit. First, equation 29 is written as an impression for signal $S_K$. This signal, it will be recalled, is the information signal from the Kth antenna element after it is demodulated by multiplier 71. Equation 29 is derived from equation 12 by inspection. Comparing equation 12 with equation 29, we see that the modulation term $\phi$ from the information signal is eliminated. This is due to the operation of demodulator 71. Also by comparison, the terms $V_I$ and $V_N$ are replaced by terms $V_I$ and $V_N$ respectively. This is due to the bandwidth compression operation that was previously described in conjunction with the derivation of signal $S_S$. Further, in comparison frequency $W_0$ is changed to frequency $W_{IF}$. This also is due to the operation of multiplier 71 as was previously described.

Using equations 25 and 29 an expression may be written for the time average correlation of signal $S_K$ with signal $S_S$. This is given as equation 30. And utilizing the identity of equation 31, equation 30 can be further simplified as expressed in equation 32. Now comparing equation 32 with the previously derived expression for the partial derivative of $T_e$ with respect to $u_k$ as given in equation 28, it is apparent that both equations 28 and 32 contain identical terms. Thus, a substantial simplification is achieved by substituting the time average correlation of signal $S_S$ and $S_K$ for the corresponding terms in equation 28.

In like manner, an expression for the time average correlation of signals $I_K+N_K$ and $I_S+N_S$ can be derived and used to further simplify equation 28. To accomplish this, equation 33 is written as an expression for signal $I_K+N_K$. Equation 33 is derived by inspection of equation 12. The difference between these two equations is that the information signal is eliminated due to the operation of bandreject filter 75, and carrier frequency $W_0$ is replaced with intermediate frequency $W_{IF}$. Now using equation 33 in combination with equation 26, an expression for the time average correlation of signals $I_S+N_S$ and $I_K+N_K$ can be derived. This is given as equation 34.

Again, by inspection equation 34 may be utilized to simplify the expression for the partial derivative of $T_e$ with respect to $u_k$ as given in equation 28. Comparison of equations 34 and 28 indicates that three of the product terms contained in equation 28 may be replaced by the time average correlation of signals $I_K+N_K$ and $I_S+N_S$. Thus, due to this simplification and the simplification that is obtained by equation 32, the partial derivative of $T_e$ with respect to $u_k$ may be rewritten as equation 35.

One further final simplification may be made to equation 35 by recognizing that the terms E ( ) are equivalent to the previously described terms $P_{se}$ and $P_I$. This equivalence is expressed by equation 36. Substitution of equation 36 into equation 35 yields equation 37. This of course, is the simplified result which we have been looking for. Equation 37 may now be substituted into equation 3A to obtain an expression for the time rate of change of multiplier weight $u_k$. This in turn yields the previously described equation 5A and 6A.

A similar analysis may be used to obtain a simplified expression for a partial derivative of $T_e$ with respect to the $v_k$. This is accomplished by deriving expressions for signals $S_{KC}$ and $I_{KC}+N_{KC}$. These expressions are given as equations 38 and 39 respectively. Utilizing equations 38 and 39 in combination with equations 25 and 26, expressions for the time average correlation of signals $S_S$ with $S_{KC}$ and signals $I_S+N_S$ with $I_{KC}+N_{KC}$ can be derived. These expressions are then used to form an expression for partial derivative of $T_e$ with respect to $v_k$ as given in equation 40. Then equation 40 is used in conjunction with the previously described equation 3B to form expressions describing the time rate of change of multiplier $v_k$.

Both the theory of the invention and various embodiments of it have now been described in detail. In addition, may changes and modifications may be made thereto within departing from the nature and spirit of the invention. For example, the FIG. 2 embodiment can be modified such that all of the signals $S_K$, $S_{KC}$, and $I_{KC}+N_{KC}$ are formed simultaneously in parallel. In this modified embodiment, switch 70 is eliminated, and circuits 71-76 and 80-87 are duplicated for each of the antenna elements. The cost of these increased number of components is counter balanced by an increase in operating speed due to the parallel operation.

Another alternative embodiment may be understood by reference to the previously described equations 5A, 5B, 6A, and 6B. These equations were derived herein with the loop gain C being a single constant. However, the derivations also hold with C in equations 5A and 6A being changed to C1, and C in equations 5B and 6B being changed to C2 where C1 and C2 are different constants.

Further, C in equations 5A and 6A may be replaced with a time variable loop gain $C_3(t)$ and C in equations 5B and 6B may be replaced with a time variable loop gain $C_4(t)$. It may be desirable for example, to choose $C_3(t)$ and $C_4(t)$ to have a relatively large initial value which decreases with time. This would allow the initial adjustments of weights $u_k$ and $v_k$ to be large to compensate for initially small $P_{se} \div P_I$ ratios. Then it would decrease the loop gain to avoid instability as the maximum ratio of $P_{se}$ to $P_I$ is reached. Thus, since many changes can be made to the details of the disclosed preferred embodiments, it is to be understood that the invetnion is not limited to those details but is defined by the appended claims.

I claim:

1. A method of maximizing the ratio of information signal power to interference plus noise power in an array of N antenna elements including the steps of:

generating at each of said antenna elements composite electrical signals $R_K = S_{KA} + I_{KA} + N_{KA}$ where $1 \leq K \leq N$, $S_{KA}$ is a modulated information signal in a first frequency band, $I_{KA}$ is at least one interference signal in said first frequency band, and $N_{KA}$ is noise produced in said antenna elements;

multiplying each of said signals $R_K$ by respective complex weights $u_k + jv_k$ to form product terms;

summing all of said product terms to thereby form a signal $R_S$;

demodulating said $R_S$ signal;

bandpass filtering said demodulated $R_S$ signal to obtain a signal $S_S$ of a second bandwidth that is substantially less than said first bandwidth and which is representative of the sum of the demodulated $S_{KA}$ signals;

bandreject filtering said demodulated $R_S$ signal to obtain a signal $I_S + N_S$ lying outside of said second bandwidth which is representative of the sum of said interference signals $I_{KA}$ and said noise $N_{KA}$;

determining terms $P_{se}$ and $P_I$ which respectively indicate the power in said signals $S_S$ and $I_S + N_S$ and;

modifying said complex weights $u_k + jv_k$ such that the time rate of change $u_k$ is proportional to the rate of change of $T_e$ with respect to $u_k$, and such that the time rate of change of $v_k$ is proportional to the rate of change $T_e$ with respect to $v_k$, where $T_e$ is representative of the ratio of $P_{se}$ to $P_I$.

2. A method according to claim 1 and further including the steps of:

changing the phase of each of said $R_K$ signals by 90° to obtain respective signals $R_{KC}$;

demodulating said $R_K$ and $R_{KC}$ signals;

bandpass filtering said demodulated $R_K$ and $R_{KC}$ signals to obtain signals $S_K$ and $S_{KC}$ respectively of said second bandwidth and which are representative of the individually demodulated $S_{KA}$ signals;

bandreject filtering said demodulated $R_K$ and $R_{KC}$ signals to obtain signals $I_K + N_K$ and $I_{KC} + N_{KC}$ respectively lying outside said second bandwidth and which are representative of said individual interference signals $I_{KA}$ and said noise $N_{KA}$;

performing time average correlations on signals $S_S$ and $S_K$;

$S_S$ and $S_{KC}$; $I_S + N_S$ and $I_N + N_K$; $I_S + N_S$ and $I_{KC} + N_{KC}$; and using said time average correlations to modify said complex weights $u_k + jv_k$.

3. A method according to claim 2 wherein said complex weights are modified according to the expressions $$\frac{du_k}{dt} = C_1 \left( \frac{\overline{S_S S_K}}{P_{se}} - \frac{\overline{(I_S+N_S)(I_K+N_K)}}{P_I} \right) \text{ and}$$

$$\frac{dv_k}{dt} = C_2 \left( \frac{\overline{S_S S_{KC}}}{P_{se}} - \frac{\overline{(I_S+N_S)(I_{KC}+N_{KC})}}{P_I} \right)$$

where the overbar indicates time average correlation of the signals below, and where C and $C_2$ are predetermined loop gains.

4. A method according to claim 2 wherein said complex weights are modified according to the expressions $$u_k(I+1) = u_k(I) + C_1 \left( \frac{\overline{S_S S_K}}{P_{se}} - \frac{\overline{(I_S+N_S)(I_K+N_K)}}{P_I} \right) \text{ and}$$

$$u_k(I+1) = u_k(I) + C_2 \left( \frac{\overline{S_S S_{KC}}}{P_{se}} - \frac{\overline{(I_S+N_S)(I_{KC}+N_{KC})}}{P_I} \right)$$

where the overbar indicates time average correlation of the signals below, and where $C_1$ and $C_2$ are predetermined loop gains.

5. A method according to claim 2 wherein said steps for forming terms $R_K$, $R_{KC}$, $S_K$, $S_{KC}$, $I_K + N_K$, and $I_{KC} + N_{KC}$ are performed sequentially for various values of K, $1 \leq K \leq N$.

6. A method according to claim 2 wherein said steps of forming terms $R_K$, $R_{KC}$, $S_K$, $I_K + N_K$, and $I_{KC} + N_{KC}$ are performed in parallel where $1 \leq K \leq N$.

7. A method according to claim 4 wherein said predetermined loop gains are constant.

8. A method according to claim 4 wherein said predetermined loop gains are time variable.

9. An adaptive antenna array for maximizing the ratio of information signal power to interference plus noise power comprised of:

a plurality of N antenna elements for generating composite electrical signals $R_K = S_{KA} + I_{KA} + N_{KA}$ where $1 \leq K \leq N$, $S_{KA}$ is a modulated information signal in a first frequency band, $I_{KA}$ is at least one interference signal in said first frequency band, and $N_{KA}$ is noise produced in said antenna elements;

multiplication means for multiplying each of said signals $R_K$ by respective complex weights $u_k + jv_k$ to form product terms;

adder means for summing all of said product terms to thereby form a signal $R_S$;

demodulation means for demodulating said $R_S$ signal;

bandpass filter means for filtering said demodulated $R_S$ signal to obtain a signal $S_S$ of a second bandwidth that is substantially less than said first bandwidth and which is representative of the sum of the demodulated $S_{KA}$ signals;

bandreject filter means for filtering said demodulated $R_S$ signal to obtain a signal $I_S + N_S$ lying outside of said second bandwidth which is representative of the sum of said interference signal $I_{KA}$ and said noise $N_{KA}$;

means for generating signals $P_{se}$ and $P_I$ which respectively indicate the power in said signals $S_S$ and $I_S + N_S$ and;

means for modifying said complex weights $u_k + jv_k$ such that the time rate of change $u_k$ is proportional to the rate of change of $T_e$ with respect to $u_k$, and such that the time rate of change of $v_k$ is proportional to the rate of change $T_e$ with respect to $v_k$, where $T_e$ is representative of the ratio of $P_{se}$ to $P_I$.

10. An adaptive antenna array according to claim 9 and further including, means for changing the phase of each of said $R_K$ signals by 90° to obtain respective $R_{KC}$ signals;

means for demodulating said $R_K$ and $R_{KC}$ signals;

means for bandpass filtering said demodulated $R_K$ and $R_{KC}$ signals to obtain signals $S_K$ and $S_{KC}$ respectively of said second bandwidth and which are representative of the individually demodulated $S_{KA}$ signals;

means for bandreject filtering said demodulated $R_K$ and $R_{KC}$ signals to obtain signals $I_K + N_K$ and $I_{KC} + N_{KC}$ respectively lying outside said second bandwidth and which are representative of said individual interference signals $I_{KA}$ and said noise $N_{KA}$;

means for performing time average correlations on signals $S_S$ and $S_K$;

$S_S$ and $S_{KC}$; $I_S + N_S$ and $I_N + N_K$; $I_S + N_S$ and $I_{KC} + N_{KC}$; and means for combining said time average correlations to modify said complex weights $u_k + jv_k$.

11. An adaptive antenna array according to claim 10 wherein said means for combining including means for modifying said complex weights according to the expressions $$\frac{du_k}{dt} = C_1 \left\{ \frac{\overline{S_S S_K}}{P_{se}} - \frac{\overline{(I_S + N_S)(I_K + N_K)}}{P_I} \right\} \text{ and}$$

$$\frac{du_k}{dt} = C_2 \left\{ \frac{\overline{S_S S_{KC}}}{P_{se}} - \frac{\overline{(I_S + N_S)(I_{KC} + N_{KC})}}{P_I} \right\}$$

where the overbar indicates time average correlation of the signals below, and where $C$, and $C_2$ are loop gains.

12. An adaptive antenna array according to claim 10 wherein said means for combining includes means for modifying said complex weights according to the expressions $$u_k(I + 1) = u_k(I) + C_1 \left\{ \frac{\overline{S_S S_K}}{P_{se}} - \frac{\overline{(I_S + N_S)(I_K + N_K)}}{P_I} \right\} \text{ and}$$

$$u_k(I + 1) = u_k(I) + C_2 \left\{ \frac{\overline{S_S S_{KC}}}{P_{se}} - \frac{\overline{(I_S + N_S)(I_{KC} + N_{KC})}}{P_I} \right\}$$

where the overbar indicates time average correlation of the signals below, and where $C_1$ and $C_2$ are loop gains.

13. An adaptive antenna array according to claim 10 and further including switching means between said antenna elements and a single set of said means for demodulating means for bandpass filtering means for bandreject filtering, and means for time average correlating to enable terms $R_K$, $R_{KC}$, $S_K$, $S_{KC}$, $I_K + N_K$ and $I_{KC} + N_{KC}$ to be sequentially formed for various values of K, $1 \leq K \leq N$.

* * * * *